US012651802B2

(12) United States Patent
Xue et al.

(10) Patent No.: US 12,651,802 B2
(45) Date of Patent: Jun. 9, 2026

(54) POLYOLEFIN POROUS FILM AND PREPARATION METHOD THEREFOR, BATTERY SEPARATOR, AND ELECTROCHEMICAL DEVICE

(71) Applicant: SINOMA LITHIUM BATTERY SEPARATOR (NANJING) CO., LTD., Jiangning (CN)

(72) Inventors: Shan Xue, Jiangning (CN); Yaozong Bai, Jiangning (CN); Guozhong Jia, Jiangning (CN); Zhigang Liu, Jiangning (CN); Lei Zheng, Jiangning (CN); Qiuchun Dong, Jiangning (CN); Yunqing Xue, Jiangning (CN); Yuan Ma, Jiangning (CN); Qiyang Wu, Jiangning (CN); Xiangan Meng, Jiangning (CN); Xujie Zhang, Jiangning (CN); Gaojun Liu, Jiangning (CN)

(73) Assignee: SINOMA LITHIUM BATTERY SEPARATOR (NANJING) CO., LTD., Nanjing (CN)

( * ) Notice: Subject to any disclaimer, the term of this patent is extended or adjusted under 35 U.S.C. 154(b) by 518 days.

(21) Appl. No.: 18/279,215

(22) PCT Filed: Apr. 25, 2023

(86) PCT No.: PCT/CN2023/090556
§ 371 (c)(1),
(2) Date: Aug. 29, 2023

(87) PCT Pub. No.: WO2024/077927
PCT Pub. Date: Apr. 18, 2024

(65) Prior Publication Data
US 2025/0079631 A1     Mar. 6, 2025

(30) Foreign Application Priority Data

Oct. 12, 2022    (CN) .......................... 202211244275.0
Oct. 28, 2022    (WO) ................ PCT/CN2022/128427

(51) Int. Cl.
*H01M 50/417*        (2021.01)
*B29C 48/00*         (2019.01)
(Continued)

(52) U.S. Cl.
CPC ....... *H01M 50/417* (2021.01); *B29C 48/0018* (2019.02); *C08J 5/18* (2013.01);
(Continued)

(58) Field of Classification Search
None
See application file for complete search history.

(56) References Cited

U.S. PATENT DOCUMENTS 6,566,012 B1 *    5/2003    Takita ................. H01M 50/494
264/210.4

FOREIGN PATENT DOCUMENTS

CN      105609686 A      5/2016
CN      110431176 A      11/2019
(Continued)

OTHER PUBLICATIONS

International Search Report for PCT/CN2023/090556 mailed Jul. 30, 2023, ISA/CN.

*Primary Examiner* — Gregg Cantelmo
(74) *Attorney, Agent, or Firm* — Yue (Robert) Xu; Apex Attorneys at Law, LLP

(57) ABSTRACT
The present disclosure relates to the technical field of separators for electrochemical devices, and discloses a polyolefin porous film and a preparation method therefor, a battery separator, and an electrochemical device. The poly-
(Continued)

500 nm olefin porous film of the present disclosure has a network fiber structure, and when observed in a 20,000×SEM image, and the polyolefin porous film has the following characteristics: (1) within a circle having a radius of 1000 nm, a fiber orientation result R_MD of fibers having a fiber diameter of greater than 15 nm in a machine direction (MD) satisfies: $(R\_MD)^2 < 0.8$; and (2) within a circle having a radius of 1000 nm, a fiber orientation result R_TD of fibers having a fiber diameter of greater than 15 nm in a transverse direction (TD) satisfies: $(R\_TD)^2 < 0.8$. Therefore, the polyolefin porous film of the present disclosure can achieve consistency of the mechanical properties as a separator in a battery, thereby improving the stability of the separator in battery production and the safety of battery application.

20 Claims, 4 Drawing Sheets

(51) Int. Cl.

| | | |
|---|---|---|
| *C08J 5/18* | (2006.01) | |
| *C08J 9/28* | (2006.01) | |
| *H01M 10/0525* | (2010.01) | |
| *H01M 50/403* | (2021.01) | |
| *H01M 50/489* | (2021.01) | |
| *H01M 50/494* | (2021.01) | |

(52) U.S. Cl.
CPC ........... *C08J 9/28* (2013.01); *H01M 10/0525* (2013.01); *H01M 50/403* (2021.01); *H01M 50/489* (2021.01); *H01M 50/494* (2021.01); *C08J 2323/06* (2013.01); *C08J 2323/12* (2013.01)

(56) References Cited

FOREIGN PATENT DOCUMENTS

| | | | | |
|---|---|---|---|---|
| CN | 111200094 | A | 5/2020 | |
| CN | 107250234 | B | 9/2020 | |
| CN | 113488740 | A | 10/2021 | |
| CN | 115312973 | A | 11/2022 | |
| EP | 1153968 | A1 * | 11/2001 | ......... B01D 67/0027 |
| JP | 2005056851 | A | 3/2005 | |
| JP | 2014141644 | A | 8/2014 | |
| KR | 1020210106274 | A | 8/2021 | |

* cited by examiner

POLYOLEFIN POROUS FILM AND PREPARATION METHOD THEREFOR, BATTERY SEPARATOR, AND ELECTROCHEMICAL DEVICE

CROSS-REFERENCE TO RELATED APPLICATIONS

This application is the national phase of International Application No. PCT/CN2023/090556, titled "POLYOLEFIN POROUS FILM AND PREPARATION METHOD THEREFOR, BATTERY SEPARATOR, AND ELECTROCHEMICAL DEVICE", filed on Apr. 25, 2023, which claims the priority of PCT patent application No. PCTCN2022128427, filed to the Chinese patent office as a receiving office on Oct. 28, 2022, and entitled "POLYOLEFIN POROUS FILM AND PREPARATION METHOD THEREFOR, BATTERY SEPARATOR, AND ELECTROCHEMICAL DEVICE", the entire contents of both of which are incorporated by reference in the present disclosure.

FIELD

The present disclosure relates to the technical field of separators for electrochemical devices, in particular to a polyolefin porous film and a preparation method therefor, a battery separator, and an electrochemical device.

BACKGROUND

As a key main material in a lithium ion battery, a separator mainly serves to insulate a positive electrode and a negative electrode, prevent a short circuit, and at the same time ensure certain electrolyte wettability and liquid retention, and provide a channel for lithium ion transport. Separator properties directly determine the interfacial performance and internal resistance of the battery, which in turn affects the charge-discharge performance and cycling performance of the battery.

A separator for a lithium ion battery in the prior art is mainly based on a polyolefin porous separator, which is a three-dimensional structure containing a large number of small through micropores inside, and having polyolefin as a skeleton to support a large number of micropores, and its preparation methods are mainly divided into dry stretching and wet stretching. A dry method is a method of forming micropores by forming a polyolefin film, and then stretching the film at a low temperature, wherein the stretching causes microcracks between thin sheets which are crystalline portions of the polyolefin. A wet method is a method in which polyolefin-based resin and a diluent are mixed at a high temperature at which the polyolefin-based resin is melted to form a single phase, the polyolefin and the diluent are subjected to phase separation during cooling, and then the diluent is extracted to form pores therein.

The wet method imparts mechanical strength and transparency through the stretching/extraction process after the phase separation treatment, and by stretching polyethylene blank sheets that have been formed into a sheet form, and adjusting the stretching conditions such as the speed, ratio, and temperature, an amorphous portion of the crystal structure is elongated, and micropores are formed between the sheet-like layers while forming microfibers. Compared with the dry method, the wet method has the advantages of a small film thickness, a uniform pore size, and excellent physical properties.

A literature with a publication number of JP2005056851A proposes a microporous film of a laminated film, in order to reduce the thermal shrinking rate in a transverse direction (TD) (a direction perpendicular to a machine, a width direction) of a separator, a preparation method thereof does not perform stretching in the TD, so it can be said that there is no shrinkage in the TD at all; however, only a single axis in a machine direction (MD) (a machine direction, a length direction) is used to form pores, thereby forming the microporous film with extreme anisotropy with insufficient strength in the TD; therefore, in the tests such as a battery crush test and a battery collision test, it may be easy to crack in one direction or the like.

A literature with a publication number of JP2014141644A describes a bidirectionally oriented porous polypropylene film with a ratio of the tensile strength in the MD to the tensile strength in the TD being 0.9 or more and less than 1.5. However, since the polypropylene film is prepared by a dry method, the air resistance is low; and the elongation at break and toughness need to be further improved.

Chinese patent No. CN107250234B discloses a polyolefin microporous film with polypropylene as a main component, a ratio of the tensile strength in the MD to the tensile strength in the TD being 0.4 or more and 2.0 or less, and a ratio of an elongation at break in the MD to an elongation at break in the TD being 0.6 or more and 1.7 or less. By adding an additive, a nucleating agent and a crystallization retarder for promoting or inhibiting crystallization of polyolefin resin, the micropore structure of the polyolefin porous film becomes uniform and fine, and the impact resistance is further improved.

Therefore, improving the performance of the separator is critical to improving the safety performance of the battery. Although the existing polyolefin porous separators can be maturely applied to lithium ion batteries, the current technology mainly focuses on the basic physical properties and the physicochemical properties of the separators, with less attention paid to the consistency of a microstructure. In order to improve the performance of separators which are prepared by the wet method for lithium-ion batteries, it is necessary to optimize their microstructures to improve their performance and optimize the uniformity of their mechanical properties in all directions.

SUMMARY

An object of the present disclosure is to provide a polyolefin porous film, which can provide a battery having excellent battery safety, and improve the stability of battery production in the case of being used as a battery separator.

An object of the present disclosure is also to provide a preparation method for the above polyolefin porous film, by controlling and reducing the difference in orientation during stretching of a separator, and controlling the forming temperature, a polyolefin porous film with uniform orientation of a microscopic fiber structure and thus small difference in macroscopic two-directional mechanical properties can be obtained.

The polyolefin porous film provided by the present disclosure is prepared by wet stretching, and has a network fiber structure; wherein when observed in a 20,000×SEM image, the polyolefin porous film has the following characteristics:

(1) within a circle having a radius of 1000 nm, a fiber orientation R_MD of fibers having a fiber diameter of greater than 15 nm in a machine direction (MD) satisfies: $(\text{R\_MD})^2 < 0.8$, wherein R_MD is obtained by the following formula 1:

$$R\_MD = \frac{\sum_{n=1}^{N}(\phi_n \cdot L_n \cdot \cos \theta_n)}{\sum_{n=1}^{N}(\phi_n \cdot \cos \theta_n)};$$

<div align="right">Formula 1</div> wherein N is the number of fibers on the outermost surface in an observation area, and each fiber is identified by n; $\theta_n$ is an angle between a fiber n and the MD, $\theta_n$ is obtained counterclockwise starting from the MD leftwards, a product of a length value $L_n$ of the fiber n in μm and cos $\theta_n$ is $L_n$ cos $\theta_n$, and $\varphi_n$ is a diameter value of the fiber n in nm; and (2) within a circle having a radius of 1000 nm, a fiber orientation R_TD of fibers having a fiber diameter of greater than 15 nm in a transverse direction (TD) satisfies: $(\text{R\_TD})^2 < 0.8$, wherein R_TD is obtained by the following formula 2:

$$R\_TD = \frac{\sum_{n=1}^{N}(\phi_n \cdot L_n \cdot \cos \beta_n)}{\sum_{n=1}^{N}(\phi_n \cdot \cos \beta_n)};$$

<div align="right">Formula 2</div> wherein N is the number of fibers on the outermost surface in an observation area, and each fiber is identified by n; $\beta_n$ is an angle between a fiber n and the TD, $\beta_n$ is obtained counterclockwise starting from the TD upwards, a product of a length value $L_n$ of the fiber n in μm and cos $\beta_n$ is $L_n$ cos $\beta_n$, and $\varphi_n$ is a diameter value of the fiber n in nm.

Optionally, the polyolefin porous film provided is prepared by wet stretching, and has a network fiber structure; wherein when observed in a 20,000×SEM image, the polyolefin porous film has the following characteristics:

(1) within a circle having a radius of 1000 nm, a fiber orientation R_MD of fibers having a fiber diameter of greater than 15 nm in the machine direction (MD) satisfies: $(\text{R\_MD})^2 < 0.5$, wherein R_MD is obtained by the following formula 1:

$$R\_MD = \frac{\sum_{n=1}^{N}(\phi_n \cdot L_n \cdot \cos \theta_n)}{\sum_{n=1}^{N}(\phi_n \cdot \cos \theta_n)};$$

<div align="right">Formula 1</div> wherein N is the number of fibers on the outermost surface in an observation area, and each fiber is identified by n; $\theta_n$ is an angle between a fiber n and the MD, $\theta_n$ is obtained counterclockwise starting from the MD leftwards, a product of a length value $L_n$ of the fiber n in μm and cos $\theta_n$ is $L_n$ cos $\theta_n$, and $\varphi_n$ is a diameter value of the fiber n in nm; and (2) within a circle having a radius of 1000 nm, a fiber orientation R_TD of fibers having a fiber diameter of greater than 15 nm in the transverse direction (TD) satisfies: $(\text{R\_TD})^2 < 0.5$, wherein R_TD is obtained by the following formula 2:

$$R\_TD = \frac{\sum_{n=1}^{N}(\phi_n \cdot L_n \cdot \cos \beta_n)}{\sum_{n=1}^{N}(\phi_n \cdot \cos \beta_n)};$$

<div align="right">Formula 2</div> wherein N is the number of fibers on the outermost surface in an observation area, and each fiber is identified by n; $\beta_n$ is an angle between a fiber n and the TD, $\beta_n$ is obtained counterclockwise starting from the TD upwards, a product of a length value $L_n$ of the fiber n in μm and cos $\beta_n$ is $L_n$ cos $\beta_n$, and $\varphi_n$ is a diameter value of the fiber n in nm.

The polyolefin microporous film further has the following characteristics;

optionally, if a ratio of the tensile strength in the MD to the tensile strength in the TD is a MD/TD tensile strength ratio, 0.8≤the MD/TD tensile strength ratio≤1.2.

Optionally, if a ratio of an elongation at break in the MD to an elongation at break in the TD is a MD/TD elongation at break ratio, 0.4≤the MD/TD elongation at break ratio≤1.2.

Optionally, the polyolefin porous film has a film thickness of 1-30 μm.

The present disclosure also provides a preparation method for the polyolefin porous film as described above, including the following steps of:

step 1, mixing polyolefin, a pore-forming agent and an additive, and extruding the mixture, wherein a mass percentage of the polyolefin in the resulting mixture is greater than or equal to 15%, and a mass percentage of an antioxidant in the resulting mixture is 0-0.5%; and after plasticizing through twin-screw high-temperature dispersive mixing, performing die extrusion to prepare a cast sheet;

step 2, stretching the cast sheet to prepare an oil film, wherein during stretching, the temperature of the cast sheet itself does not exceed 140° C., and a temperature difference between different points of a temperature field in a stretching area is less than 0.5° C., and a ratio of a stretching ratio in the MD to a stretching ratio in the TD, i.e., a ratio of MD/TD stretching is:

$$0.9 \le \text{the ratio of } MD/TD \text{ stretching} \le 1.1;$$

and step 3, performing extraction on the oil film, and then performing heat setting treatment, wherein a relationship between the original stretching ratio in the MD and the original stretching ratio in the TD needs to be maintained during the heat setting treatment, and the ratio of the stretching ratio in the MD to the stretching ratio in the TD in the step 2 is maintained by expansion stretching treatment during the heat setting treatment.

Optionally, in the step 2, the stretching ratio in the MD and the stretching ratio in the TD are both 5 times or more.

Optionally, the polyolefin has a viscosity average molecular weight of 0.2 million to 5 million.

Optionally, the pore-forming agent is one or more selected from white oil, paraffin oil, and polyethylene glycol.

Optionally, the additive in the step 1 includes an antioxidant, wherein the antioxidant is one or more selected from an amine, a sulfur-containing compound, a nitrogen-containing compound, a phosphorus-containing compound, and an organic metal salt.

The present disclosure also provides a battery separator, including the polyolefin porous film as described above.

The present disclosure also provides an electrochemical device, including the polyolefin porous film as described above or the battery separator as described above as an element for separating a positive electrode from a negative electrode.

The present disclosure has the following beneficial effects:

the polyolefin porous film of the present disclosure can achieve consistency of the mechanical properties as a separator in a battery, thereby improving the stability of the separator in battery production and the safety of battery applications.

BRIEF DESCRIPTION OF THE DRAWINGS

In order to illustrate the technical solutions of the examples of the present disclosure more clearly, the drawings required to be used in the examples will be briefly described below, it should be understood that the following drawings illustrate only certain examples of the present disclosure, and are therefore not to be considered as limiting the scope, and for those of ordinary skill in the art, other related drawings can be obtained from these drawings without inventive steps.

DETAILED DESCRIPTION OF THE EMBODIMENTS

Figure 1:
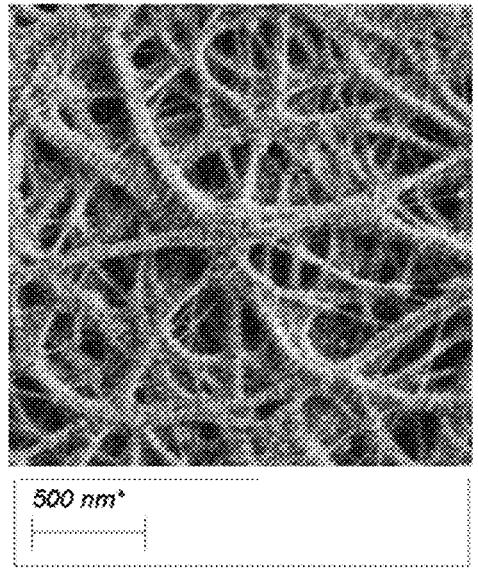
FIG. 1 is a scanning electron micrograph showing a polyolefin porous film of Example 1.
Figure 2:
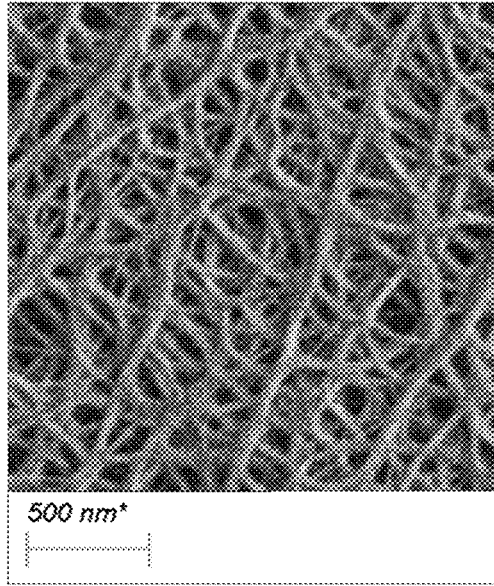
FIG. 2 is a scanning electron micrograph showing a polyolefin porous film of Example 2.
Figure 3:
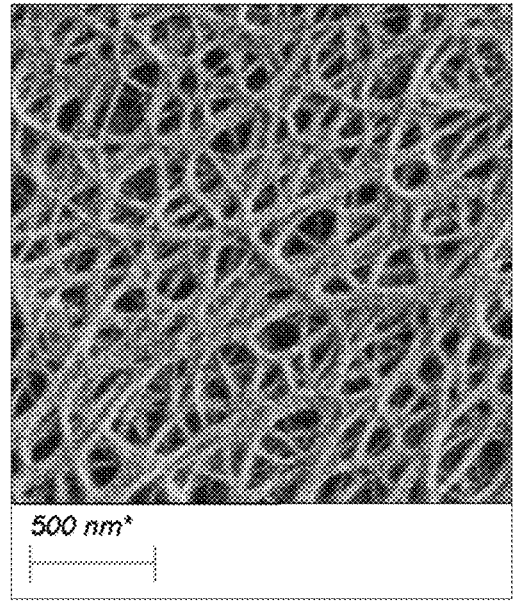
FIG. 3 is a scanning electron micrograph showing a polyolefin porous film of Example 3.
Figure 4:
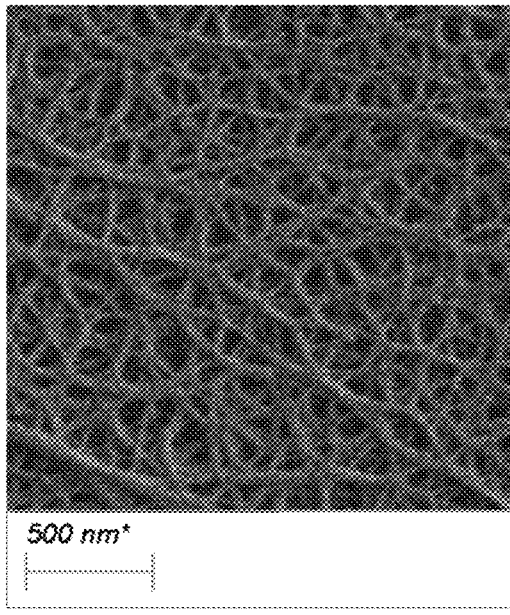
FIG. 4 is a scanning electron micrograph showing a polyolefin porous film of Example 4.
Figure 5:
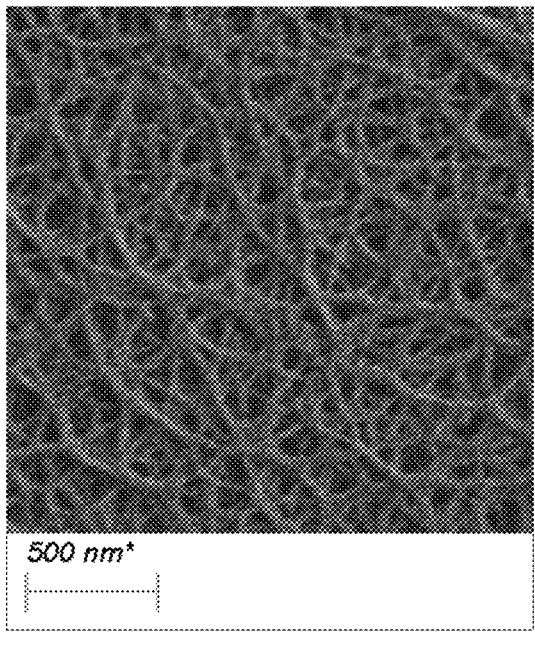
FIG. 5 is a scanning electron micrograph showing a polyolefin porous film of Example 5.
Figure 6:
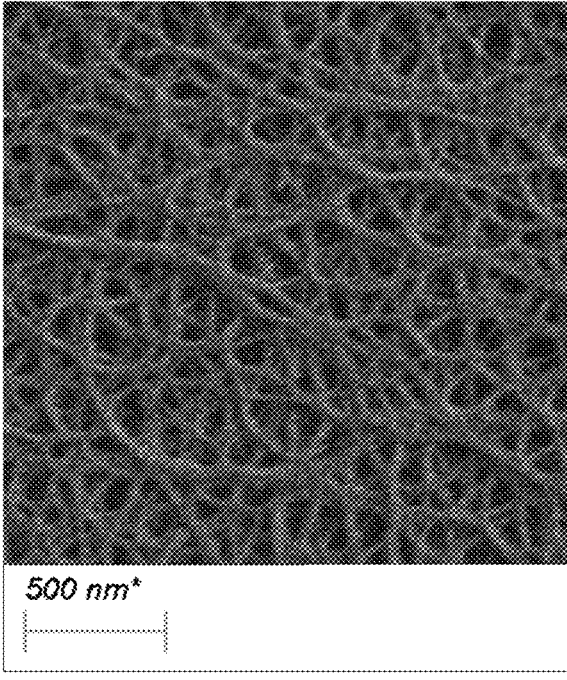
FIG. 6 is a scanning electron micrograph showing a polyolefin porous film of Example 6.
Figure 7:
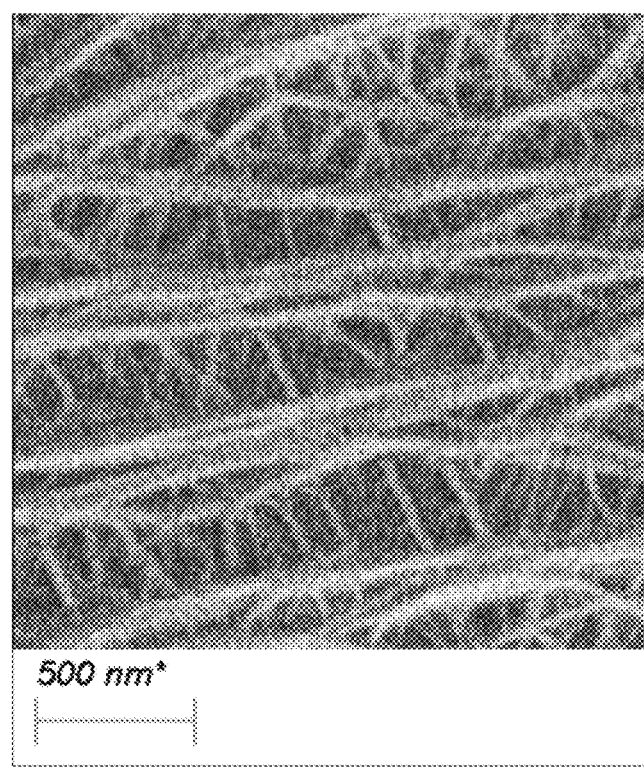
FIG. 7 is a scanning electron micrograph showing a polyolefin porous film of Example 9.

In order to make the objectives, technical solutions and advantages of the examples of the present disclosure more clear, the technical solutions in the examples of the present disclosure will be clearly and completely described below. If the conditions are not specified in the examples, conventional conditions or conditions recommended by the manufacturer shall be followed. Reagents or instruments used of which the manufacturer is not specified are conventional products that are commercially available.

The present discloser finds that the uniformity of a fiber structure in a polyolefin porous film is an important guarantee for the performance of a separator, and the microscopic fiber structure characteristics determine the macroscopic properties of the polyolefin porous film as a battery separator, wherein the degree of uniformity of distribution and orientation of the fibers determines the uniformity of mechanical properties of the separator, and when the polyolefin porous film has the following characteristics, excellent uniformity of mechanical properties in all directions can be obtained, thereby having higher safety in battery applications.

When observed in a 20,000×SEM image, the polyolefin porous film has the following characteristics:

(1) within a circle having a radius of 1000 nm, a fiber orientation R_MD of fibers having a fiber diameter of greater than 15 nm in a machine direction (MD) satisfies: $(R\_MD)^2 < 0.8$, wherein R_MD is obtained by the following formula 1:

$$R\_MD = \frac{\sum_{n=1}^{N}(\phi_n \cdot L_n \cdot \cos \theta_n)}{\sum_{n=1}^{N}(\phi_n \cdot \cos \theta_n)};$$ Formula 1 wherein N is the number of fibers on the outermost surface in an observation area, and each fiber is identified by n; $\theta_n$ is an angle between a fiber n and the MD, $\theta_n$ is obtained counterclockwise starting from the MD leftwards, a product of a length value $L_n$ of the fiber n in μm and $\cos \theta_n$ is $L_n \cos \theta_n$, and $\varphi_n$ is a diameter value of the fiber n in nm; and (2) within a circle having a radius of 1000 nm, a fiber orientation R_TD of fibers having a fiber diameter of greater than 15 nm in a transverse direction (TD) satisfies: $(R\_TD)^2 < 0.8$, wherein R_TD is obtained by the following formula 2:

$$R\_TD = \frac{\sum_{n=1}^{N}(\phi_n \cdot L_n \cdot \cos \beta_n)}{\sum_{n=1}^{N}(\phi_n \cdot \cos \beta_n)};$$ Formula 2 wherein N is the number of fibers on the outermost surface in an observation area, and each fiber is identified by n; $\beta_n$ is an angle between a fiber n and the TD, $\beta_n$ is obtained counterclockwise starting from the TD upwards, a product of a length value $L_n$ of the fiber n in μm and $\cos \beta_n$ is $L_n \cos \beta_n$, and $\varphi_n$ is a diameter value of the fiber n in nm.

In one solution, the polyolefin porous film provided is prepared by wet stretching, and has a network fiber structure; and when observed in a 20,000×SEM image, the polyolefin porous film has the following characteristics:

(1) within a circle having a radius of 1000 nm, a fiber orientation R_MD of fibers having a fiber diameter of greater than 15 nm in the machine direction (MD) satisfies: $(R\_MD)^2 < 0.5$, wherein R_MD is obtained by the following formula 1:

$$R\_MD = \frac{\sum_{n=1}^{N}(\phi_n \cdot L_n \cdot \cos \theta_n)}{\sum_{n=1}^{N}(\phi_n \cdot \cos \theta_n)};$$ Formula 1 wherein N is the number of fibers on the outermost surface in an observation area, and each fiber is identified by n; $\theta_n$ is an angle between a fiber n and the MD, $\theta_n$ is obtained counterclockwise starting from the MD leftwards, a product of a length value $L_n$ of the fiber n in μm and $\cos \theta_n$ is $L_n \cos \theta_n$, and $\varphi_n$ is a diameter value of the fiber n in nm; and (2) within a circle having a radius of 1000 nm, a fiber orientation R_TD of fibers having a fiber diameter of greater than 15 nm in the transverse direction (TD) satisfies: $(R\_TD)^2 < 0.5$, wherein R_TD is obtained by the following formula 2:

$$R\_TD = \frac{\sum_{n=1}^{N}(\phi_n \cdot L_n \cdot \cos\beta_n)}{\sum_{n=1}^{N}(\phi_n \cdot \cos\beta_n)};$$ Formula 2 wherein N is the number of fibers on the outermost surface in an observation area, and each fiber is identified by n; $\beta_n$ is an angle between a fiber n and the TD, $\beta_n$ is obtained counterclockwise starting from the TD upwards, a product of a length value $L_n$ of the fiber n in µm and cos $\beta_n$ is $L_n \cos\beta_n$, and $\varphi_n$ is a diameter value of the fiber n in nm.

[Polyolefin Resin]

The polyolefin resin used as a raw material may use, for example, polyethylene, polypropylene and the like. As polyethylene, there are no specific restrictions, various polyethylenes can be used, for example, ultra-high molecular weight polyethylene (UHMwPE), high-density polyethylene (HDPE), medium-density polyethylene, branched low-density polyethylene, linear low-density polyethylene, and the like can be used.

It should be noted that polyethylene may be a homopolymer of ethylene or a copolymer of ethylene and other alpha-olefins. As the α-olefin, propylene, 1-butene, 1-hexene, 1-pentene, 4-methyl-1-pentene, octene, vinyl acetate, methyl methacrylate, styrene and the like can be enumerated.

In this specification, the polyolefin porous film refers to a microporous film having polyolefin resin as a main component, for example, a microporous film in which the polyolefin resin accounts for 90% or more by mass of the total amount of the microporous film. Hereinafter, the physical properties of the polyolefin porous film of this embodiment will be described.

[MD/TD Tensile Strength Ratio]

A ratio of the tensile strength in the MD to the tensile strength in the TD, i.e., a MD/TD tensile strength ratio, of the polyolefin porous film of the present disclosure is optionally 0.8 or more and 1.2 or less. When the tensile strength ratio is in the above range, it can bear the forces more uniformly when facing impacts from all directions, and therefore, the impact resistance is improved when the polyolefin porous film is applied to a battery as a separator, the separator is more stable, and separator rupture and short circuit can be inhibited.

In view of being safer and more stable in battery applications, optionally, the MD/TD tensile strength ratio is close to 1. At this time, there is no directional dependence for the strength of the polyolefin porous film, and thus, when a stress is applied to the film, the film has excellent toughness and will not crack in a specific direction, and enlargement of through holes can be avoided even if foreign matters penetrate the microporous film. Otherwise, when the tensile strength in the MD is too high, tearing in the MD sometimes occurs. When the tensile strength in the TD is too high, tearing in the TD sometimes occurs or bonding of an adhesive portion of an electrode contact is detached to become easily short-circuited.

[MD/TD Elongation at Break Ratio]

A ratio of an elongation at break in the MD to an elongation at break in the TD, i.e., a MD/TD elongation at break ratio, of the polyolefin porous film of the present disclosure is optionally 0.8 or more and 1.2 or less. When the elongation at break ratio is in the above range, it can bear the forces more uniformly when facing impacts from all directions, and therefore, the impact resistance is improved when the polyolefin porous film is applied to a battery as a separator, the separator is more stable, and separator rupture and short circuit can be inhibited.

In view of being safer and more stable in battery applications, optionally, the MD/TD elongation at break ratio is close to 1. At this time, there is no directional dependence for the strength of the polyolefin porous film, and therefore, when a stress is applied to the film, the film has excellent toughness and will not crack in a specific direction, and the enlargement of through holes can be avoided even if foreign matters penetrate the microporous film.

[Film Thickness]

There is no particular limitation on the film thickness of the polyolefin porous film. From the viewpoint of film strength, the polyolefin porous film of the present disclosure has a thickness of 2 µm or more, optionally 5 µm or more. In addition, from the viewpoint of permeability, the microporous film has a thickness of 50 µm or less, optionally 30 µm or less.

[Tensile Strength]

The polyolefin porous film of the present disclosure has a tensile strength of 150 MPa or more, optionally 200 MPa or more in both the MD and the TD. If the tensile strength is weak, the windability of the battery will be deteriorated or a short circuit is easily generated due to a battery collision test performed from the outside, foreign matters in the battery, or the like. In addition, an upper limit of the tensile strength in the MD and the TD is not particularly limited, and from practical production experience, the upper limit of the tensile strength in the MD and the TD is optionally 700 MPa or less, optionally 600 MPa or less, optionally 550 MPa or less.

[Elongation at Break]

The polyolefin porous film of the present disclosure optionally has an elongation at break of 90% or more in the MD and an elongation at break of 90% or more in the TD, respectively. When the elongation at break is in the above range, its flexibility is utilized to inhibit the occurrence of rupture and short-circuiting of the separator upon impact in the battery. In addition, an upper limit of the elongation at break in the MD and the TD is not particularly limited, for example, 400% or less, optionally 300% or less, optionally 200% or less. When the elongation at break is in the above range, the separator is not elongated to be deformed when an electrode is wound, and the windability is good.

The elongation at break in the MD and the elongation at break in the TD are optionally 10-200%, respectively, optionally 10-150%, optionally 10-120%. The microporous film having the elongation at break in the MD and the elongation at break in the TD in the above range is not only good in battery windability, but also is not likely to cause deformation in a battery collision test or the like.

[Thermal Shrinkage Rate]

The polyolefin porous film also needs to be excellent in heat shrinkage characteristics at a high temperature as a separator, such as showing excellent results in a high-temperature storage test, a high-temperature cycle test, a baking test, and the like in a state of being made into a battery.

Starting from the dimensional stability of the separator during charge and discharge, the thermal shrinkage rate in the MD is less than 5%, and the thermal shrinkage rate in the TD is less than 6.5%, optionally, the thermal shrinkage rate in the MD is 4% or less, and the thermal shrinkage rate in the TD is 4% or less, optionally, the thermal shrinkage rate in the MD is 3% or less, and the thermal shrinkage rate in the TD is 2.5% or less, and optionally, the thermal shrinkage rate in the MD is 1% or less, and the thermal shrinkage rate in the TD is 1% or less. When the thermal shrinkage rate is greater than the above-mentioned optional range, the microporous film easily shrinks in the width direction in a battery drying process, a battery high-temperature cycle test, a battery high-temperature preservation test, or the like, and the microporous film is not preferred.

[Preparation Method for the Polyolefin Porous Film]

The polyolefin porous film of the present disclosure is prepared by wet stretching, and a preparation method therefor includes: (1) by using one or more polyolefin resin materials above as main raw materials, mixing the above raw materials with a pore-forming agent and an antioxidant, and performing die extrusion on the mixture to prepare a cast sheet; (2) biaxially stretching the cast sheet to prepare an oil film; and (3) performing extraction on the oil film, and then performing heat setting treatment.

Wherein, the control of the temperature and the ratio of the stretching ratios of the cast sheet during stretching is one of the key factors for obtaining a polyolefin porous film having the above-mentioned characteristics; a temperature field and a stretching field need to be controlled during biaxial stretching, the temperature of the cast sheet itself shall not exceed 140° C., and a temperature difference between different points of a temperature field in a stretching area is less than 0.5° C., it is necessary that the ratio of the stretching ratio in the MD to the stretching ratio in the TD is 0.9 or more and 1.1 or less, and when an actual ratio of the stretching ratios is in the above range, the balance of the tensile strength or elongation at break of the obtained polyolefin porous film in the MD and the TD becomes good, and the film strength can be further improved, and the impact resistance can be improved.

Secondly, during the heat setting treatment, a relationship between the original stretching ratio in the MD and the original stretching ratio in the TD needs to be maintained, and maintaining the ratio of the stretching ratio in the MD to the stretching ratio in the TD during the the heat setting treatment as the ratio of the stretching ratios of the biaxial stretching in the step (2), i.e., 0.9 or more and 1.1 or less is a second key factor.

Wherein the stretching ratio in the MD and the stretching ratio in the TD are an actual stretching ratio in the MD and an actual stretching ratio in the TD of the separator.

For synchronous stretching, a stretching ratio in the MD and a stretching ratio in the TD can be obtained directly from actual settings of equipment, or can be obtained in the following manner: a synchronous stretching ratio in the MD is equal to a ratio of a rate of the oil film prepared after synchronous stretching in the MD to a running rate of the sheet before entering the stretching; and a synchronous stretching ratio in the TD is equal to a ratio of a width of the oil film prepared after synchronous stretching in the TD to a width of a TD stretched region of the sheet before entering the stretching, and attention should be paid to deducting a width of a clamping part of a clamp.

For asynchronous stretching, an asynchronous stretching ratio in the MD can be obtained directly from actual settings of equipment, or can be obtained from a ratio of a rate of the sheet after stretching in the MD and before entering stretching in the TD to a rate before stretching; and an asynchronous stretching ratio in the TD is a ratio of an actual width of the oil film after stretching in the TD is finished to an actual width of a gel sheet before stretching in the MD.

For the preparation method for the polyolefin porous film, as long as the polyolefin porous film having the above-mentioned characteristics can be obtained, the types and proportions of the polyolefin, the pore-forming agent and the antioxidant, a method of mixing and extrusion, the types and use or not of an extractant, a process of mild heat setting, and the like are not particularly limited.

The polyolefin resin used as a raw material may use, for example, polyethylene, polypropylene and the like. As polyethylene, there are no specific restrictions, various polyethylenes can be used, for example, ultra-high molecular weight polyethylene (UHMWPE), high-density polyethylene (HDPE), medium-density polyethylene, branched low-density polyethylene, linear low-density polyethylene, and the like can be used. It should be noted that polyethylene may be a homopolymer of ethylene or a copolymer of ethylene and other alpha-olefins. As the α-olefin, propylene, 1-butene, 1-hexene, 1-pentene, 4-methyl-1-pentene, octene, vinyl acetate, methyl methacrylate, styrene and the like can be enumerated.

From the viewpoint of a polymer melt being easy to process and no separator rupture, the viscosity average molecular weight of the polyolefin resin is 200,000 or more and 5 million or less; and when the viscosity average molecular weight of the polyolefin resin is in the above range, the film-making property becomes good.

In addition, a film-forming material may contain a polymer of other resin components besides the polyolefin material as required, for example, high-temperature-resistant resin such as polypropylene, polyimide, polyamide, fluorine resin, and the like may be used. Wherein a mass percentage of the polyolefin in the mixture is greater than or equal to 15%, and a mass percentage of the high-temperature-resistant resin in the mixture is less than 10%.

The pore-forming agent can be a liquid hydrocarbon mixture such as white oil, an organic acid ester such as dioctyl phthalate (DOP), an inorganic acid ester such as trioctyl phosphate (TOP), an organic compound capable of forming a homogeneous solution with the polyolefin resin, or a mixture of the above pore-forming agents, or the like.

The antioxidant can use only one main antioxidant or a combination of a plurality of antioxidants. The addition of the antioxidant can slow down the aging degradation of the polymer and the pore-forming agent during shear processing, as well as effectively improve the color, flatness, and strength of the film surface.

Optionally, the stretching temperature is higher than a softening point (Tcd) of a mixture formed by sufficiently melting the polyolefin resin and the pore-forming agent, and is lower than a melting point of the polyolefin resin. It should be noted that the melting point of the polyolefin resin here refers to a melting point of the polyolefin resin in a gel-like sheet. When the stretching temperature is the melting point of the polyolefin resin or below; the melting of the polyolefin resin in the gel-like sheet is inhibited, and a molecular chain can be effectively oriented by extension. In addition, when the stretching temperature is the softening point (Tcd) or above, the polyolefin resin in the gel-like sheet can be sufficiently softened to lower the stretching tension, and therefore, the film-making property becomes good, separator rupture during stretching can be inhibited, and stretching can be performed at a high ratio. The stretching temperature may be set to be, for example, 50° C. or more and 140° C. or less, optionally 60° C. or more and 130° C. or less. Here, the stretching temperature refers to the temperature of the gel sheet.

By controlling and reducing the difference in orientation during stretching of a separator, and controlling the forming temperature, a polyolefin porous film with uniform orientation of a microscopic fiber structure and thus small difference in macroscopic two-directional mechanical properties can be obtained, and in the case of being used as a separator for batteries, the stability of the separator in battery production and the safety of battery application can be improved.

EXAMPLE

Hereinafter, the present disclosure is illustrated in detail by examples. It should be noted that the present disclosure is not limited to these examples.

Example 1

25 parts by weight of polyethylene powder (GUR4116, Ticona Celanese), 5 parts by weight of polypropylene (T30S, Zhenhai Refining & Chemical Company), and 70 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the polyolefin composition and the paraffin oil in total, and they were mixed in sequence. A ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 120° C. at a rate of 40 m/min, wherein stretching was performed at a ratio of 6.5 in both the MD and the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 15%, heat setting and expansion were carried out at 131° C. to achieve a ratio of the original stretching ratio in the MD to the original stretching ratio in the TD to finally obtain a polyolefin porous film having a uniform fiber structure orientation.

Example 2

23 parts by weight of ultra-high molecular weight polyethylene powder (GUR4012, Ticona Celanese) and 77 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 117° C. at a rate of 40 m/min, wherein stretching was performed at a ratio of 7.5 in the MD, and stretching was performed at a ratio of 7.2 in the TD. The uniformity of a temperature field needed to be controlled during stretching, and a temperature difference between different points of the temperature field in a stretching area is less than 0.3° C., and an oil film was prepared after stretching. The oil film was drawn into dichloromethane for extraction to extract the paraffin oil from the oil film.

Residual dichloromethane in a separator was then carried out by hot air at a constant temperature of 40° C., and since a small amount of shrinkage occurred in the TD under the action of drawing in the MD during the extraction and drying process, the shrinkage being 18%, heat setting and expansion were carried out at 131° C. to achieve a ratio of the original stretching ratio in the MD to the original stretching ratio in the TD to finally obtain a polyolefin porous film having a uniform fiber structure orientation.

Example 3

15 parts by weight of ultra-high molecular weight polyethylene powder (GUR2122, Ticona Celanese), 5 parts by weight of high-density polyethylene powder (GUR4116, Ticona Celanese), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 122° C. at a rate of 40 m/min, wherein stretching was performed at a ratio of 7.2 in the MD, and stretching was performed at a ratio of 7.1 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 20%, heat setting and expansion were carried out at 131° C. to achieve a ratio of the original stretching ratio in the MD to the original stretching ratio in the TD to finally obtain a polyolefin porous film having a uniform fiber structure orientation.

Example 4

5 parts by weight of ultra-high molecular weight polyethylene powder (GUR2122, Ticona Celanese), 10 parts by weight of high-density polyethylene powder (VH200U, KPIC), 5 parts by weight of polyethylene powder (VH035, KPIC), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 117° C. at a rate of 40 m/min, wherein stretching was performed at a ratio of 6.8 in the MD, and stretching was performed at a ratio of 6.8 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 21%, heat setting and expansion were carried out at 131° C. to achieve a ratio of the original stretching ratio in the MD to the original stretching ratio in the TD to finally obtain a polyolefin porous film having a uniform fiber structure orientation.

Example 5

5 parts by weight of ultra-high molecular weight polyethylene powder (GUR2122, Ticona Celanese), 10 parts by weight of high-density polyethylene powder (VH200U, KPIC), 5 parts by weight of polyethylene powder (VH035, KPIC), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 116° C. at a rate of 40 m/min, wherein stretching was performed at a ratio of 8 in the MD, and stretching was performed at a ratio of 8 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 21%, heat setting and expansion were carried out at 131° C. to achieve a ratio of the original stretching ratio in the MD to the original stretching ratio in the TD to finally obtain a polyolefin porous film having a uniform fiber structure orientation.

Example 6

5 parts by weight of ultra-high molecular weight polyethylene powder (GUR2122, Ticona Celanese), 10 parts by weight of high-density polyethylene powder (VH200U, KPIC), 5 parts by weight of polyethylene powder (VH035, KPIC), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 115° C. at a rate of 40 m/min, wherein stretching was performed at a ratio of 10 in the MD, and stretching was performed at a ratio of 10 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 21%, heat setting and expansion were carried out at 131° C. to achieve a ratio of the original stretching ratio in the MD to the original stretching ratio in the TD to finally obtain a polyolefin porous film having a uniform fiber structure orientation.

Example 7

5 parts by weight of ultra-high molecular weight polyethylene powder (GUR2122, Ticona Celanese), 10 parts by weight of high-density polyethylene powder (VH200U, KPIC), 5 parts by weight of polyethylene powder (VH035, KPIC), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 115° C. at a rate of 40 m/min, wherein stretching was performed at a ratio of 10 in the MD, and stretching was performed at a ratio of 11 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 21%, heat setting and expansion were carried out at 131° C. to achieve a ratio of the original stretching ratio in the MD to the original stretching ratio in the TD to finally obtain a polyolefin porous film having a uniform fiber structure orientation.

Example 8

5 parts by weight of ultra-high molecular weight polyethylene powder (GUR2122, Ticona Celanese), 10 parts by weight of high-density polyethylene powder (VH200U, KPIC), 5 parts by weight of polyethylene powder (VH035, KPIC), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 115° C. at a rate of 40 m/min, wherein stretching was performed at a ratio of 10 in the MD, and stretching was performed at a ratio of 9.1 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 21%, heat setting and expansion were carried out at 131° C. to achieve a ratio of the original stretching ratio in the MD to the original stretching ratio in the TD to finally obtain a polyolefin porous film having a uniform fiber structure orientation.

Example 9

15 parts by weight of ultra-high molecular weight polyethylene powder (VH200U, LPIC), 5 parts by weight of high-density polyethylene powder (VH035, KPIC), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched in steps. The cast sheet was stretched in the MD at 90° C., wherein a stretching ratio in the MD was 9; and rapid stretching in the TD was then carried out at 119° C. at a rate of 60 m/min with a stretching ratio in the TD of 8.3 (a ratio of an outlet width to an original width of the cast sheet was 8.2). The uniformity of a temperature field needed to be controlled during stretching, and a temperature difference between different points of the temperature field in a stretching area was less than 0.3° C., and an oil film was prepared after stretching was finished. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of MD drawing during the extraction and drying process, the shrinkage being 22%, heat setting and expansion were carried out at 131° C. to achieve a ratio of the original stretching ratio in the MD to the original stretching ratio in the TD to finally obtain a polyolefin porous film having a uniform fiber structure orientation.

Comparative Example 1

25 parts by weight of ultra-high molecular weight polyethylene powder (GUR4116, Ticona Celanese) and 77 parts by weight of paraffin oil (60 #, Zhejiang Zhengxin) were used, 0.3 part by weight of an antioxidant (Irg1010 (Ciba Specialty Chemicals BASF)) and 0.1 part by weight of antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 117° C. at a rate of 40 m/min, wherein stretching was performed at a ratio of 7.9 in the MD, and stretching was performed at a ratio of 6.5 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 18%, heat setting and expansion were carried out at 131° C. to achieve a ratio of the original stretching ratio in the MD to the original stretching ratio in the TD to finally obtain a polyolefin porous film.

Comparative Example 2

5 parts by weight of ultra-high molecular weight polyethylene powder (GUR2122, Ticona Celanese), 10 parts by weight of high-density polyethylene powder (VH200U, KPIC), 5 parts by weight of polyethylene powder (VH035, KPIC), and 80 parts by weight of paraffin oil (60 #, Zhejiang Zhengxin) were used, 0.3 part by weight of an antioxidant (Irg1010 (Ciba Specialty Chemicals BASF)) and 0.1 part by weight of an antioxidant (P168 (manufactured by Ciba Specialty Chemicals Co., Ltd.) were added relative to 100 parts by weight of the high molecular weight polyethylene and the paraffin oil in total, and they were mixed in sequence. The ultra-high molecular weight polyethylene material after being mixed with an auxiliary was fed into a twin-screw extruder together with the paraffin oil for mixing to finally prepare a mixture melt gel.

The gel was extruded by using a T-die with the melt extrusion temperature controlled at 220° C. or below; then rapidly cooled on a thermostated metal double crusher with a surface temperature of 15° C., and rolled into a sheet with a sheet thickness of 1.5 mm.

The sheet, i.e. a cast sheet, was drawn and stretched. Rapid stretching was performed at 116° C. at a rate of 40 m/min, wherein stretching was performed at a ratio of 7.1 in the MD, and stretching was performed at a ratio of 5.4 in the TD. The uniformity of a temperature field needed to be controlled during stretching, and a temperature difference between different points of the temperature field in a stretching area was less than 0.3° C., and an oil film was prepared after stretching. The oil film was drawn into dichloromethane for extraction to extract the paraffin oil from the oil film. Residual dichloromethane in a separator was then carried out by hot air at a constant temperature of 40° C., and since a small amount of shrinkage occurred in the TD under the action of drawing in the MD during the extraction and drying process, the shrinkage being 21%, heat setting and expansion were carried out at 131° C. to achieve a ratio of the original stretching ratio in the MD to the original stretching ratio in the TD to finally obtain a polyolefin porous film.

<Evaluation Method>

(1) Film Thickness Test

The thickness of the polyolefin porous films obtained in the examples was tested with a tenthousandth micrometer.

(2) Fiber Orientation Degree Test

By using a Nova Nano SEM 450 field emission scanning electron microscope from FEI Corporation in USA, a 20,000×SEM image of the polyolefin porous film was obtained, and a circle with a radius of 1000 nm was used as an observation area for observation.

According to the formula 1 and the formula 2 above, a fiber orientation result R_MD in the MD and a fiber orientation result R_TD in the TD of the polyolefin porous film were obtained.

It should be noted that during calculating R_MD and R_TD, fibers taken are fibers on the outermost surface of the polyolefin porous film, N is the number of fibers on the outermost surface in the observation area, each fiber is identified by n (n is a natural number), the length of a fiber taken refers to a length of a segment with a same thickness that has a same extension direction on a same fiber, when the thickness of the same fiber changes, it is not counted as a length, and a difference needs to be corrected timely, the segment with the same thickness means that a width of the thickest portion in the segment is increased within 5% compared with a width of the thinnest portion, the fiber diameter is an average of a width of the widest portion and the width of the thinnest portion of the segment with the same thickness, and the angle between the fiber and the MD or the TD is an angle between the extension direction of the segment with the same thickness and the MD or the TD.

(3) Tensile Strength Test

A test was carried out according to the requirements of GB 1040.3-2006, and samples were prepared by cutting, and were type 2 samples. The samples were in the form of elongated strips of 200 mm in length and 25 mm in width, a distance between clamps was (100±5) mm, and a test speed was (250±10) mm/min.

(4) Elongation at Break Test

A test was carried out according to the requirements of GB 1040.3-2006, and samples were prepared by cutting, and were type 2 samples. The samples were in the form of elongated strips f 200 mm in length and 25 mm in width, a distance between clamps was (100±5) mm, and a test speed was (250±10) mm/min.

(5) Thermal Shrinkage Rate Test

A test was carried out according to the requirements of GB/T12027-2004, and samples of 100 mm×100 mm were taken from a polyolefin microporous separator, and placed in a forced air oven for standing for 1 h at 105° C. The thermal shrinkage rate may be obtained by the following formulas.

Thermal shrinkage rate in the $MD$ (%) =

(a length in the $MD$ before heating − a length in the $MD$ after heating) ÷ the length in the $MD$ before heating × 100

Thermal shrinkage rate in the $TD$ (%) =

(a length in the $TD$ before heating − a length in the $TD$ after heating) ÷ the length in the $TD$ before heating × 100

Referring to Tables 1-2, the performance test results of the above Examples and Comparative examples are as follows:

TABLE 1

Related performance parameter indexes of polyolefin porous films in Examples 1-9

| Serial number | Features | Example 1 | Example 2 | Example 3 | Example 4 | Example 5 | Example 6 | Example 7 | Example 8 | Example 9 |
|---|---|---|---|---|---|---|---|---|---|---|
| 1 | Thickness (μm) | 9.7 | 8.7 | 9.9 | 9 | 7 | 6 | 5.3 | 6.5 | 7.2 |
| 2 | Air permeability (sec/100 cc) | 238 | 213 | 134 | 252 | 190 | 130 | 98 | 145 | 180 |
| 3 | Tensile strength in the MD (MPa) | 188 | 293 | 239 | 384 | 465 | 530 | 521 | 528 | 485 |
| 4 | Tensile strength in the TD (MPa) | 169 | 253 | 217 | 375 | 460 | 515 | 539 | 479 | 465 |
| 5 | MD/TD tensile strength ratio | 1.11 | 1.16 | 1.1 | 1.02 | 1.01 | 1.03 | 0.97 | 1.10 | 1.04 |
| 6 | Elongation at break in the MD (%) | 77 | 90 | 80 | 117 | 105 | 98 | 101 | 91 | 103 |
| 7 | Elongation at break in the TD (%) | 85 | 92 | 86 | 125 | 112 | 107 | 102 | 118 | 116 |
| 8 | MD/TD elongation at break ratio | 0.91 | 0.98 | 0.93 | 0.94 | 0.94 | 0.92 | 0.99 | 0.77 | 0.89 |
| 9 | Thermal shrinkage rate in the MD (%), 105° C.-1 h | 2.7 | 2.7 | 2.5 | 2.1 | 2.3 | 2.5 | 2.1 | 2.9 | 2.7 |
| 10 | Thermal shrinkage rate in the TD (%), 105° C.-1 h | 0.6 | 0.8 | 0.9 | 0.8 | 0.9 | 1.2 | 1.8 | 0.9 | 1.0 |
| 11 | $(R\_MD)^2$ | 0.16 | 0.34 | 0.36 | 0.14 | 0.15 | 0.13 | 0.11 | 0.15 | 0.69 |
| 12 | $(R\_TD)^2$ | 0.06 | 0.09 | 0.09 | 0.08 | 0.07 | 0.11 | 0.13 | 0.09 | 0.14 |

TABLE 2

Related performance parameter indexes of polyolefin porous films in Comparative examples 1-2

| Serial number | Features | Comparative example 1 | Comparative example 2 |
|---|---|---|---|
| 1 | Thickness (μm) | 8.3 | 8.1 |
| 2 | Air permeability (sec/100 cc) | 129 | 228 |
| 3 | Tensile strength in the MD (MPa) | 238 | 361 |
| 4 | Tensile strength in the TD (MPa) | 142 | 264 |
| 5 | MD/TD tensile strength ratio | 1.68 | 1.37 |
| 6 | Elongation at break in the MD (%) | 62 | 90 |
| 7 | Elongation at break in the TD (%) | 107 | 134 |
| 8 | MD/TD elongation at break ratio | 0.58 | 0.67 |
| 9 | Thermal shrinkage rate in the MD (%), 105° C.-1 h | 2.2 | 3.14 |
| 10 | Thermal shrinkage rate in the TD (%), 105° C.-1 h | 1 | 2.12 |
| 11 | $(R\_MD)^2$ | 1.1 | 0.98 |
| 12 | $(R\_TD)^2$ | 0.04 | 0.04 |

Tables 1 and 2 are the related performance indexes of the polyolefin porous films in Examples 1-9, and the polyolefin porous films in Comparative examples 1-2, respectively, it can be seen that when the fiber orientation result R_MD in the MD satisfies $(R\_MD)^2 < 0.8$, and the fiber orientation result R_TD in the TD satisfies $(R\_TD)^2 < 0.8$ in the polyolefin porous film, the separator can obtain excellent uniformity of mechanical properties in all directions, thereby having higher safety in battery applications.

The above descriptions are optional examples of the present disclosure, and are not intended to limit the present disclosure, and for those skilled in the art, various modifications and variations may be made to the present disclosure. Any modifications, equivalent replacements, improvements, etc. made within the spirit and principles of the present disclosure shall be included within the scope of protection of the present disclosure.

What is claimed is:

1. A polyolefin porous film, having a network fiber structure; wherein when observed in a 20,000×SEM image, the polyolefin porous film has the following characteristics:

(1) within a circle having a radius of 1000 nm, a fiber orientation R_MD of fibers having a fiber diameter of greater than 15 nm in a machine direction (MD) satisfies: $(R\_MD)^2 < 0.8$, wherein R_MD is obtained by the following formula 1:

$$R\_MD = \frac{\sum_1^n (\phi_n \cdot L_n \cdot \cos\theta_n)}{\sum_1^n (\phi_n \cdot \cos\theta_n)}; \qquad \text{Formula 1}$$

wherein θn is an angle between a fiber and the MD, θn is obtained counterclockwise starting from the MD leftwards, a product of a fiber length value Ln in μm and cos θn is Ln cos θn, and φn is a fiber diameter value in nm; and (2) within a circle having a radius of 1000 nm, a fiber orientation R_TD of fibers having a fiber diameter of greater than 15 nm in a transverse direction (TD) satisfies: $(R\_TD)^2 < 0.8$, wherein R_TD is obtained by the following formula 2:

$$R\_TD = \frac{\sum_1^n (\phi_n \cdot L_n \cdot \cos\beta_n)}{\sum_1^n (\phi_n \cdot \cos\beta_n)};$$

Formula 2 wherein $\beta_n$ is an angle between a fiber and the TD, $\beta_n$ is obtained counterclockwise starting from the TD upwards, a product of a fiber length value $L_n$ in μm and cos $\beta_n$ is $L_n$ cos $\beta_n$, and $\phi_n$ is a fiber diameter value in nm.

2. The polyolefin porous film according to claim 1, having a network fiber structure; wherein when observed in a 20,000×SEM image, the polyolefin porous film has the following characteristics:

(1) within a circle having a radius of 1000 nm, a fiber orientation R_MD of fibers having a fiber diameter of greater than 15 nm in the machine direction (MD) satisfies: $(R\_MD)^2 < 0.5$, wherein R_MD is obtained by the following formula 1:

$$R\_MD = \frac{\sum_1^n (\phi_n \cdot L_n \cdot \cos\theta_n)}{\sum_1^n (\phi_n \cdot \cos\theta_n)};$$

Formula 1 wherein $\theta_n$ is an angle between a fiber and the MD, $\theta_n$ is obtained counterclockwise starting from the MD leftwards, a product of a fiber length value $L_n$ in μm and cos $\theta_n$ is $L_n$ cos $\theta_n$, and $\phi_n$ is a fiber diameter value in nm; and (2) within a circle having a radius of 1000 nm, a fiber orientation R_TD of fibers having a fiber diameter of greater than 15 nm in the transverse direction (TD) satisfies: $(R\_TD)^2 < 0.5$, wherein R_TD is obtained by the following formula 2:

$$R\_TD = \frac{\sum_1^n (\phi_n \cdot L_n \cdot \cos\beta_n)}{\sum_1^n (\phi_n \cdot \cos\beta_n)};$$

Formula 2 wherein $\beta_n$ is an angle between a fiber and the TD, $\beta_n$ is obtained counterclockwise starting from the TD upwards, a product of a fiber length value $L_n$ in μm and cos $\beta_n$ is $L_n$ cos $\beta_n$, and $\phi_n$ is a fiber diameter value in nm.

3. The polyolefin porous film according to claim 1, wherein a ratio of the tensile strength in the MD to the tensile strength in the TD, i.e., a MD/TD tensile strength ratio is:

$$0.8 \le \text{the } MD/TD \text{ tensile strength ratio} \le 1.2.$$

4. The polyolefin porous film according to claim 1, wherein a ratio of an elongation at break in the MD to an elongation at break in the TD, i.e., a MD/TD elongation at break ratio is:

$$0.75 \le \text{the } MD/TD \text{ elongation at break ratio} \le 1.34.$$

5. The polyolefin porous film according to claim 1, wherein the polyolefin porous film has a film thickness of 1-30 μm.

6. The polyolefin porous film according to claim 2, wherein a ratio of the tensile strength in the MD to the tensile strength in the TD, i.e., a MD/TD tensile strength ratio is:

$$0.75 \le \text{the } MD/TD \text{ elongation at break ratio} \le 1.34.$$

7. The polyolefin porous film according to claim 2, wherein a ratio of an elongation at break in the MD to an elongation at break in the TD, i.e., a MD/TD elongation at break ratio is:

$$0.8 \le \text{the } MD/TD \text{ tensile strength ratio} \le 1.2.$$

8. The polyolefin porous film according to claim 2, wherein the polyolefin porous film has a film thickness of 1-30 μm.

9. A battery separator, comprising the polyolefin porous film according to claim 1.

10. An electrochemical device, comprising the battery separator according to claim 9 as an element for separating a positive electrode from a negative electrode.

11. A preparation method for a polyolefin porous film, wherein the polyolefin porous film has a network fiber structure; and when observed in a 20,000×SEM image, the polyolefin porous film has the following characteristics:

(1) within a circle having a radius of 1000 nm, a fiber orientation R_MD of fibers having a fiber diameter of greater than 15 nm in a machine direction (MD) satisfies: $(R\_MD)^2 < 0.8$, wherein R_MD is obtained by the following formula 1:

$$R\_MD = \frac{\sum_1^n (\phi_n \cdot L_n \cdot \cos\theta_n)}{\sum_1^n (\phi_n \cdot \cos\theta_n)};$$

Formula 1 wherein $\theta_n$ is an angle between a fiber and the MD, $\theta_n$ is obtained counterclockwise starting from the MD leftwards, a product of a fiber length value $L_n$ in μm and cos $\theta_n$ is $L_n$ cos $\theta_n$, and $\phi_n$ is a fiber diameter value in nm; and (2) within a circle having a radius of 1000 nm, a fiber orientation R_TD of fibers having a fiber diameter of greater than 15 nm in a transverse direction (TD) satisfies: $(R\_TD)^2 < 0.8$, wherein R_TD is obtained by the following formula 2:

$$R\_TD = \frac{\sum_1^n (\phi_n \cdot L_n \cdot \cos\beta_n)}{\sum_1^n (\phi_n \cdot \cos\beta_n)};$$

Formula 2 wherein $\beta_n$ is an angle between a fiber and the TD, $\beta_n$ is obtained counterclockwise starting from the TD upwards, a product of a fiber length value $L_n$ in μm and cos $\beta_n$ is $L_n$ cos $\beta_n$, and $\phi_n$ is a fiber diameter value in nm; and the preparation method comprises the following steps of:

step 1, mixing polyolefin, a pore-forming agent and an additive, and extruding the mixture, to prepare a cast sheet;

step 2, stretching the cast sheet to prepare an oil film, wherein during stretching, the temperature of the cast sheet itself does not exceed 140° C., and a temperature difference between different points of a temperature field in a stretching area is less than 0.5° C., and a ratio of a stretching ratio in the MD to a stretching ratio in the TD, i.e., a ratio of MD/TD stretching is:

$$R\_MD = \frac{\sum_1^n (\phi_n \cdot L_n \cdot \cos\theta_n)}{\sum_1^n (\phi_n \cdot \cos\theta_n)};$$ Formula 1 step 3, performing extraction on the oil film, and then performing heat setting treatment, wherein the ratio of the stretching ratio in the MD to the stretching ratio in the TD in the step 2 is maintained by expansion stretching treatment during the heat setting treatment.

12. The preparation method for the polyolefin porous film according to claim 11, wherein the polyolefin porous film has a network fiber structure; and when observed in a 20,000×SEM image, the polyolefin porous film has the following characteristics:

(1) within a circle having a radius of 1000 nm, a fiber orientation R_MD of fibers having a fiber diameter of greater than 15 nm in the machine direction (MD) satisfies: $(R\_MD)^2 < 0.5$, wherein R_MD is obtained by the following formula 1:

$$0.9 \leq \text{the ratio of } MD/TD \text{ stretching} \leq 1.1; \text{ and}$$

wherein $\theta_n$ is an angle between a fiber and the MD, $\theta_n$ is obtained counterclockwise starting from the MD leftwards, a product of a fiber length value $L_n$ in μm and $\cos\theta_n$ is $L_n \cos\theta_n$, and $\phi_n$ is a fiber diameter value in nm; and (2) within a circle having a radius of 1000 nm, a fiber orientation R_TD of fibers having a fiber diameter of greater than 15 nm in the transverse direction (TD) satisfies: $(R\_TD)^2 < 0.5$, wherein R_TD is obtained by the following formula 2:

$$R\_TD = \frac{\sum_1^n (\phi_n \cdot L_n \cdot \cos\beta_n)}{\sum_1^n (\phi_n \cdot \cos\beta_n)};$$ Formula 2 wherein $\beta_n$ is an angle between a fiber and the TD, $\beta_n$ is obtained counterclockwise starting from the TD upwards, a product of a fiber length value $L_n$ in μm and $\cos\beta_n$ is $L_n \cos\beta_n$, and $\phi_n$ is a fiber diameter value in nm; and the preparation method comprises the following steps of:

step 1, mixing polyolefin, a pore-forming agent and an additive, and extruding the mixture, to prepare a cast sheet;

step 2, stretching the cast sheet to prepare an oil film, wherein during stretching, the temperature of the cast sheet itself does not exceed 140° C., and a temperature difference between different points of a temperature field in a stretching area is less than 0.5° C., and a ratio of a stretching ratio in the MD to a stretching ratio in the TD, i.e., a ratio of MD/TD stretching is: $0.9 \leq$ the ratio of MD/TD stretching $\leq 1.1$; and step 3, performing extraction on the oil film, and then performing heat setting treatment, wherein the ratio of the stretching ratio in the MD to the stretching ratio in the TD in the step 2 is maintained by expansion stretching treatment during the heat setting treatment.

13. The preparation method for the polyolefin porous film according to claim 11, wherein in the step 2, the stretching ratio in the MD and the stretching ratio in the TD are both 5 times or more.

14. The preparation method for the polyolefin porous film according to claim 11, wherein in the step 1, a mass percentage of the polyolefin in the resulting mixture is greater than or equal to 15%, and the polyolefin has a viscosity average molecular weight of 0.2 million to 5 million.

15. The preparation method for the polyolefin porous film according to claim 11, wherein the additive comprises an antioxidant, wherein a mass percentage of the antioxidant in the resulting mixture is 0-0.5%, and in the step 1, the antioxidant is one or more selected from an amine, a sulfur-containing compound, a nitrogen-containing compound, a phosphorus-containing compound, and an organic metal salt.

16. The preparation method for the polyolefin porous film according to claim 11, wherein the pore-forming agent is one or more selected from white oil, paraffin oil, and polyethylene glycol.

17. The preparation method for the polyolefin porous film according to claim 12, wherein in the step 2, the stretching ratio in the MD and the stretching ratio in the TD are both 5 times or more.

18. The preparation method for the polyolefin porous film according to claim 12, wherein in the step 1, a mass percentage of the polyolefin in the resulting mixture is greater than or equal to 15%, and the polyolefin has a viscosity average molecular weight of 0.2 million to 5 million.

19. The preparation method for the polyolefin porous film according to claim 12, wherein the additive comprises an antioxidant, wherein a mass percentage of the antioxidant in the resulting mixture is 0-0.5%, and in the step 1, the antioxidant is one or more selected from an amine, a sulfur-containing compound, a nitrogen-containing compound, a phosphorus-containing compound, and an organic metal salt.

20. The preparation method for the polyolefin porous film according to claim 12, wherein the pore-forming agent is one or more selected from white oil, paraffin oil, and polyethylene glycol.

* * * * *